US010059256B1

(12) United States Patent
Diedrich (10) Patent No.: US 10,059,256 B1
(45) Date of Patent: Aug. 28, 2018

(54) VEHICLE GRILLE ASSEMBLY ILLUMINATION

(71) Applicant: Honda Motor Co., Ltd., Tokyo (JP)

(72) Inventor: Nathaniel W. Diedrich, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/719,971

(22) Filed: Sep. 29, 2017

(51) Int. Cl.
*B60Q 1/26* (2006.01)
*H05B 33/08* (2006.01)
*B60R 13/00* (2006.01)
*B60Q 1/28* (2006.01)
*B60R 19/52* (2006.01)

(52) U.S. Cl.
CPC ............ *B60Q 1/2661* (2013.01); *B60Q 1/28* (2013.01); *B60R 13/005* (2013.01); *B60R 19/52* (2013.01); *H05B 33/0845* (2013.01); *B60Q 2400/20* (2013.01); *B60R 2019/525* (2013.01)

(58) Field of Classification Search
CPC ..... F21V 23/02; F21V 25/12; H05B 37/0236; A63J 17/00; F21L 14/026; B60Q 3/0293; B60Q 11/005; B60Q 1/387; B60Q 1/2603; B60Q 3/048; B60Q 1/44; B60Q 1/143; B60Q 1/1423; B60Q 9/001; B60Q 2300/112; B60Q 1/1415; B60Q 1/54; B60Q 1/122; B60Q 2300/122; B60Q 1/124; B60Q 1/18; B60Q 2300/314; B60Q 2300/42; B60R 16/03; H02K 21/48; B62J 6/001; B62J 6/003; H02J 7/1492
See application file for complete search history.

(56) References Cited

U.S. PATENT DOCUMENTS

| 7,040,791 B2 * | 5/2006 | Nakamura | B60Q 1/0041 362/365 |
| 8,480,253 B1 * | 7/2013 | Baker | B60Q 1/32 362/217.1 |
| 2005/0036327 A1 | 2/2005 | Patel | |
| 2017/0151903 A1 * | 6/2017 | Salter | B60Q 1/22 |

FOREIGN PATENT DOCUMENTS

| GB | 2429961 | 3/2007 |
| WO | 2016051043 | 4/2016 |

* cited by examiner

Primary Examiner — Minh D A
(74) Attorney, Agent, or Firm — Rankin, Hill & Clark LLP (57) ABSTRACT

One or more systems and techniques for illumination of a vehicle grille assembly are provided herein. The vehicle grille assembly may include a backlight panel, a vehicle grille structure, an emblem controller, and a peripheral controller. The backlight panel includes a plurality of light emitting diodes (LEDs). The vehicle grille structure includes a first opening associated with an emblem and a plurality of second openings arranged circumferentially about the first opening. The emblem controller controls illumination of emblem LEDs to illuminate in an order tracing an outline associated with the emblem. The peripheral controller controls illumination of peripheral LEDs arranged circumferentially about the emblem LEDs to illuminate outwardly in a lateral direction from the center portion.

20 Claims, 11 Drawing Sheets

VEHICLE GRILLE ASSEMBLY ILLUMINATION

BACKGROUND

Vehicle grilles generally cover an opening in a body of a vehicle. For example, a radiator grille is placed at the front of the vehicle and in front of the radiator and the engine of the vehicle. Vehicle grilles may have different cosmetic designs and be decorative, while also providing structure for preventing debris, such as leaves, from entering an engine compartment of the vehicle.

BRIEF DESCRIPTION

According to one aspect, a system for controlling illumination of a vehicle grille assembly includes a backlight panel, a vehicle grille structure, an emblem controller, and a peripheral controller. The backlight panel includes a plurality of light emitting diodes (LEDs) arranged in at least one array. The vehicle grille structure is arranged facing the backlight panel such that light emitted from the backlight panel is directed to an inner surface of the vehicle grille structure and viewable from an outer surface of the vehicle grille structure. The vehicle grille structure includes a first opening associated with an emblem arranged at a center portion of the vehicle grille structure and a plurality of second diamond shaped openings arranged circumferentially about the first opening. The emblem controller controls illumination of LEDs at a center portion of the backlight panel to illuminate in an order tracing an outline associated with the emblem. The peripheral controller controls illumination of LEDs arranged circumferentially about the center portion of the backlight panel to illuminate outwardly in a lateral direction from the center portion.

The emblem controller may control a first set of emblem LEDs leading the tracing, a second set of emblem LEDs following the first set of LEDs, a third set of emblem LEDs following the second set of emblem LEDs, and a fourth set of emblem LEDs following the third set of emblem LEDs. The system may include a timing sequence logic defining the first, second, third, and fourth set of emblem LEDs from a set of LEDs associated with the outline of the emblem at a first time. The timing sequence logic may define the first, second, third, and fourth set of emblem LEDs from the set of LEDs associated with the outline of the emblem differently at a second time than at the first time. The emblem controller may control illumination of the first set of emblem LEDs at a first illumination level, the second set of emblem LEDs at a second illumination level greater than the first illumination level, the third set of emblem LEDs at a third illumination level, and the fourth set of emblem LEDs at a fourth illumination level less than the first illumination level. The fourth illumination level may be off.

The emblem controller may control illumination of the LEDs tracing the outline to include at least two trace paths which illuminate in a simultaneous fashion. The emblem controller may control illumination of the LEDs tracing the at least two trace paths to include a common start point or a common end point. The peripheral controller may control a first set of peripheral LEDs and a second set of peripheral LEDs, the first set of peripheral LEDs arranged circumferentially adjacent to the center portion of the backlight panel, the second set of peripheral LEDs arranged circumferentially about the first set of peripheral LEDs. The peripheral controller may illuminate the first set of peripheral LEDs at a first illumination level at a first time and illuminate the first set of peripheral LEDs at a second illumination level less than the first illumination level and illuminates the second set of peripheral LEDs at the first illumination level at a second time.

The timing sequence logic may define the first set of peripheral LEDs and the second set of peripheral LEDs from a set of LEDs arranged circumferentially about the center portion of the backlight panel at a first time and define the first set of peripheral LEDs and the second set of peripheral LEDs differently at a second time. The timing sequence logic may initiate illumination of a first set of LEDs at a first time, initiate illumination of a second set of LEDs at a second time after the first time, and disable illumination of the first set of LEDs at the second time.

The first opening and the second openings may extend from the vehicle grille structure obliquely towards the backlight panel. The vehicle grille structure may be pentagonally shaped.

According to one aspect, a system for controlling illumination of a vehicle grille assembly includes a backlight panel, a vehicle grille structure, an emblem controller, a peripheral controller, and a timing sequence logic. The backlight panel may include a plurality of light emitting diodes (LEDs) arranged in a matrix configuration. The vehicle grille structure may be arranged facing the backlight panel such that light emitted from the backlight panel is directed to an inner surface of the vehicle grille structure and viewable from an outer surface of the vehicle grille structure. The vehicle grille structure may include a first opening associated with an emblem arranged at a center portion of the vehicle grille structure and a plurality of second diamond shaped openings arranged circumferentially about the first opening. The emblem controller may control illumination of LEDs at a center portion of the backlight panel to illuminate in an order tracing an outline associated with the emblem. The peripheral controller may control illumination of LEDs arranged circumferentially about the center portion of the backlight panel to illuminate outwardly in a lateral direction from the center portion. The timing sequence logic may control a first activation timing associated with the emblem controller and a second activation timing associated with the peripheral controller, wherein the second activation timing is after the first activation timing, and the first timing is based on a vehicle ignition signal.

The emblem controller may control a first set of emblem LEDs leading the tracing, a second set of emblem LEDs following the first set of LEDs, a third set of emblem LEDs following the second set of emblem LEDs, and a fourth set of emblem LEDs following the third set of emblem LEDs. The emblem controller may define the first set of emblem LEDs based on a first trace width, the second set of emblem LEDs based on a second trace width greater than the first trace width, the third set of emblem LEDs based on a third trace width, and the fourth set of emblem LEDs based on a fourth trace width. The emblem controller may control illumination of the LEDs tracing the outline to include at least two trace paths which illuminate in a simultaneous fashion. The emblem controller may control illumination of the LEDs tracing the at least two trace paths to include a common start point or a common end point.

According to one aspect, a method for controlling illumination of a vehicle grille assembly may include providing a backlight panel including a plurality of light emitting diodes (LEDs) arranged in at least one array; providing a vehicle grille structure arranged facing the backlight panel such that light emitted from the backlight panel is directed to an inner surface of the vehicle grille structure and viewable from an outer surface of the vehicle grille structure, wherein the vehicle grille structure includes a first opening associated with an emblem arranged at a center portion of the vehicle grille structure and a plurality of second diamond shaped openings arranged circumferentially about the first opening; controlling illumination of LEDs at a center portion of the backlight panel to illuminate in an order tracing an outline associated with the emblem; and controlling, after tracing the outline, illumination of LEDs arranged circumferentially about the center portion of the backlight panel to illuminate outwardly in a lateral direction from the center portion of the backlight panel.

DETAILED DESCRIPTION

Figure 1:
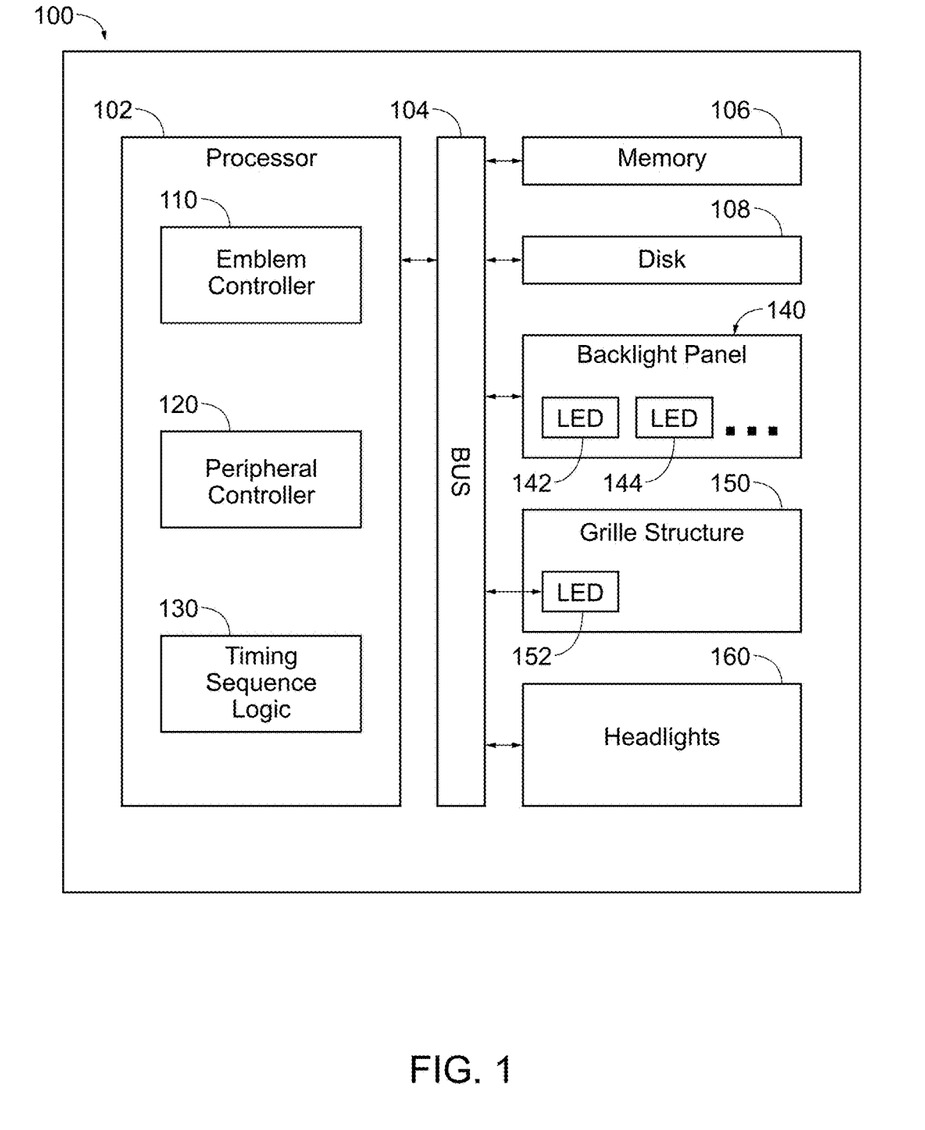
FIG. 1 is a block diagram of a system for controlling illumination of a vehicle grille assembly.

FIG. 1 is a block diagram of a system 100 for controlling illumination of a vehicle grille assembly. The system 100 may include a processor 102, in communication, via a bus 104, with a memory 106, and a disk 108. The processor 102 may include different sets of controllers and/or logics, such as an emblem controller 110, a peripheral controller 120, and a timing sequence logic 130. The emblem controller 110 and the peripheral controller 120 may drive or control, via the bus 104, a backlight panel 140, which includes a plurality of light emitting diodes (LEDs) 142, 144, etc. The LEDs of the backlight panel 140 may be arranged according to an array or matrix configuration. The backlight panel 140 is secured to a vehicle grille structure 150, which may include LEDs 152 of its own. Additionally, the system 100 may include headlights 160, which may also be controlled by the processor 102 via the bus 104.

The processor 102, emblem controller 110, peripheral controller 120, and the timing sequence logic 130 work in concert to control or drive illumination of the LEDs 142, 144 of the backlight panel 140, which arranged with the vehicle grille structure 150, results in animation of an emblem and peripheral designs of the vehicle grille structure 150. In this way, illumination of the vehicle grille assembly is provided. Generally, the emblem controller 110 controls or directs illumination of LEDs of the backlight panel 140 to illuminate the emblem, while the peripheral controller 120 controls or directs illumination of LEDs 142, 144 of the backlight panel 140 to illuminate the peripheral designs. Stated another way, the emblem controller 110 and the timing sequence logic 130 control illumination of LEDs of the backlight panel 140 to illuminate in an order tracing an outline associated with the emblem. The peripheral controller 120 and the timing sequence logic 130 control illumination of LEDs of the backlight panel 140 to illuminate one or more peripheral designs in an outwardly expanding fashion. The timing sequence logic 130 may control one or more timings or define sets of LEDs associated with initialization and/or illumination of respective LEDs.

Figure 2A:
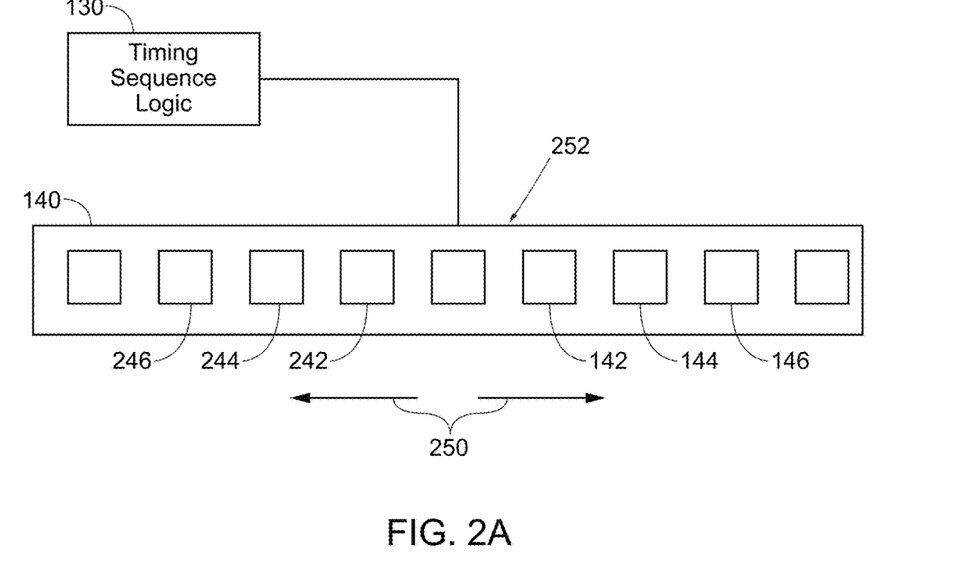
FIG. 2A is a block diagram illustrating operation of timing sequence logic for the system for controlling illumination of the vehicle grille assembly of FIG. 1.

FIG. 2A is a block diagram illustrating operation of the timing sequence logic 130 for the system 100 for controlling illumination of the vehicle grille assembly of FIG. 1. The timing sequence logic 130 may assign LEDs 142, 144 of the backlight panel 140 to different groups or sets of LEDs. In this way, the timing sequence logic 130 may define sets of LEDs (e.g., a first set, second set, third set, first emblem set, second emblem set, third emblem set, first peripheral set, second peripheral set, etc.). For example, with reference to FIG. 2A, the timing sequence logic 130 may define LEDs 142 and 242 as a first set of LEDs, LEDs 144 and 244 as a second set of LEDs, and LEDs 146 and 246 as a third set of LEDs. Further, the timing sequence logic 130 may control an order of illumination for these sets of LEDs. For example, the timing sequence logic 130 and the peripheral controller 120 may control illumination of the LEDs or sets of LEDs to illuminate outwardly in a lateral direction from a center portion 252 of the backlight panel 140 by illuminating the first set of LEDs at a first time, which may be based on a vehicle ignition signal received across the bus 104 (e.g., a controller area network or CAN bus), the second set of LEDs at a second time after the first time, and the third set of LEDs at a third time after the second time, as indicated by trace paths 250.

Figure 2B:
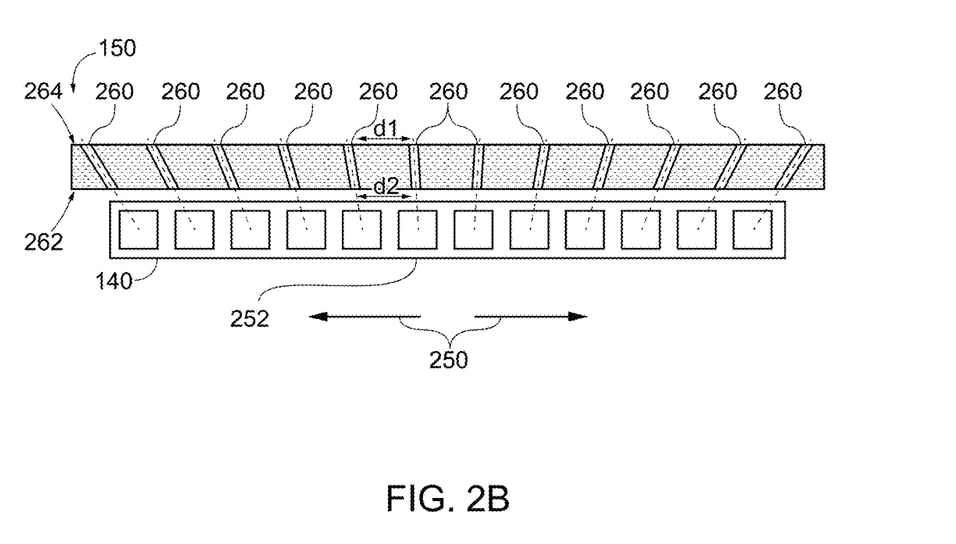
FIG. 2B is an exploded view of a portion of the vehicle grille assembly of FIG. 1.

FIG. 2B is an exploded view of a portion of the vehicle grille assembly of FIG. 1, including the vehicle grille structure 150 and the backlight panel 140. The vehicle grille structure 150 includes a plurality of openings 260 or perforations. The vehicle grille structure 150 is arranged facing the backlight panel 140 such that light emitted from the backlight panel 140 is directed to an inner surface 262 of the vehicle grille structure 150 and viewable from an outer surface 264 of the vehicle grille structure 150. According to one or more aspects, one or more of the openings 260 may extend from the vehicle grille structure 150 obliquely towards the backlight panel 140. For example, with reference to the center portion 252 of the backlight panel 140 (e.g., near 250) a distance from a given opening to the center portion 252 may be greater on the outer surface 264 of the vehicle grille structure 150 than the corresponding distance associated with the inner surface 262 of the vehicle grille structure 150. In other words, d1 is greater than d2, according to one or more aspects.

Due to the oblique arrangement of one or more of the openings 260, light emitting from an LED of the backlight panel 140 may appear at a first illumination level through a first opening and a second illumination level through a second opening. In other words, light emitted from an LED may pass through openings other than openings directly above that LED, but may not necessarily appear as bright, for example.

Figure 3:
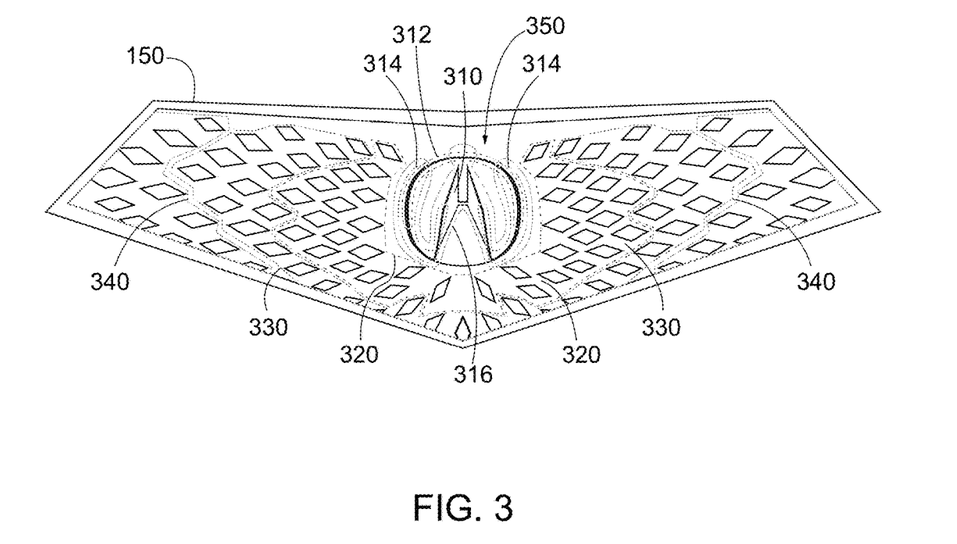
FIG. 3 is an illustration of an exemplary vehicle grille structure, according to one or more aspects.

FIG. 3 is an illustration of an exemplary vehicle grille structure 150, according to one or more aspects. The vehicle grille structure 150 may be pentagonally shaped. The vehicle grille structure 150 may include two or more sets of openings, such as a first opening 310 and second openings (e.g., sets of diamond shaped openings 320, 330, and 340). As seen in FIG. 3, the first opening 310 is associated with and has the shape of an emblem or logo, may include sets and/or subsets (e.g., a first set, second set, third set, etc.) of emblem openings 312, 314, and 316, and is arranged at a center portion 350 of the vehicle grille structure 150. The plurality of second openings, including sets and/or subsets of second openings 320, 330, and 340 are arranged circumferentially about the first opening 310 or about the center portion 350 of the vehicle grille structure 150.

As previously discussed, the openings 310, 320, 330, and 340 may be formed to extend obliquely or at an angle from the inner surface 262 of the vehicle grille structure 150 to the outer surface 264 of the vehicle grille structure 150. For example, one or more of the openings 310, 320, 330, and 340 may be formed such that a distance from the center portion 350 of the vehicle grille structure 150 to an opening on the inner surface 262 of the vehicle grille structure 150 is less than a distance from the center portion 350 of the vehicle grille structure 150 to the corresponding opening at the outer surface 264 of the vehicle grille structure 150.

Figure 4A:
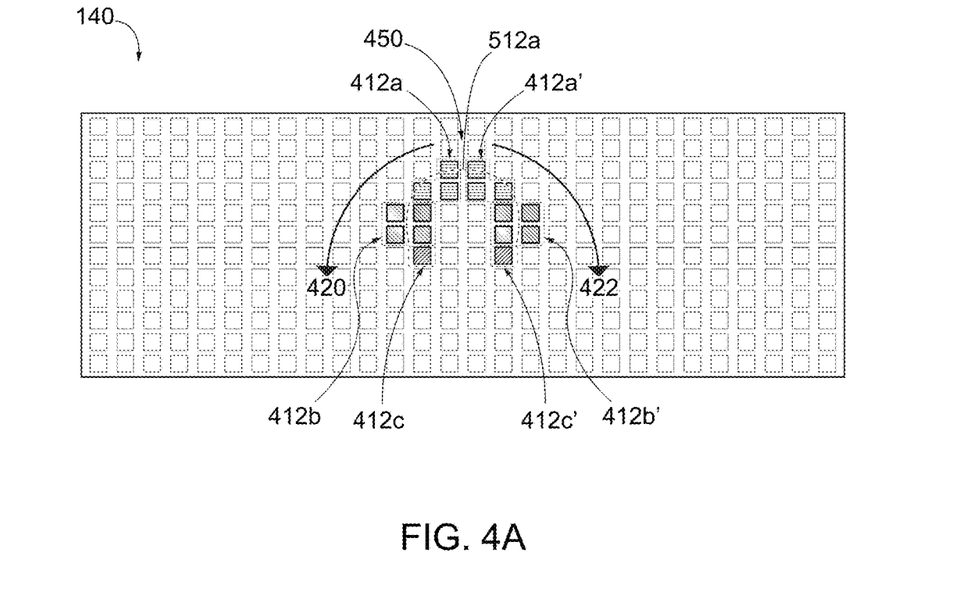
FIGS. 4A-4D are illustrations of a backlight panel of the system for controlling illumination of the vehicle grille assembly of FIG. 1.

FIGS. 4A-4D are illustrations of the backlight panel 140 of the system 100 for controlling illumination of the vehicle grille assembly of FIG. 1. In FIG. 4A, the LEDs of the backlight panel 140 are controlled by the emblem controller 110 and the timing sequence logic 130. Specifically, the emblem controller 110 may define or control illumination of one or more sets (e.g., a first set of emblem LEDs, a second set of emblem LEDs, a third set of emblem LEDs, a fourth set of emblem LEDs, etc.) of emblem LEDs from a set of LEDs associated with the outline of the emblem 512*a*. The emblem LEDs may be located at a center portion 450 of the backlight panel 140. Each set of the emblem LEDs may be controlled by the emblem controller 110 and the timing sequence logic 130 to illuminate based on a predetermined sequence (e.g., stored on the disk 108 of the system 100), and at a predetermined illumination level, etc. For example, 412*a* and 412*a*' may be defined by the emblem controller 110 as the first set of emblem LEDs at a first time (e.g., defined by the timing sequence logic 130). 412*b* and 412*b*' may be defined as the second set of emblem LEDs at the first time. 412*c* and 412*c*' may be defined as the third set of emblem LEDs at the first time.

The emblem controller 110 may define one or more trace paths 420, 422 based on the sets of emblem LEDs. The timing sequence logic 130 may control the order (e.g., sequence) and the timing of the illumination for the sets of the emblem LEDs, as will be discussed below. A first trace path 420 includes emblem LEDs 412*a*, 412*b*, and 412*c*. A second trace path 422 includes 412*a*', 412*b*', and 412*c*'. According to one or more aspects, the emblem controller 110 may control illumination of the first and second trace paths 420 and 422 to illuminate corresponding LEDs to trace the outline 512*a* of the emblem at the first and second paths 420 and 422 in a simultaneous fashion. Further, because the timing sequence logic 130 may set the first set of emblem LEDs 412*a*, 412*a*' to illuminate at the same time, the two trace paths 420 and 422 may include a common start point.

The emblem controller 110 and/or the timing sequence logic 130 may control illumination of one or more of the sets of emblem LEDs, such as by controlling an order of illumination for the sets of emblem LEDs. For example, the timing sequence logic 130 may set the order of illumination to include the first set of emblem LEDs at a first time (e.g., associated with startup or ignition of a vehicle, which may be defined by a vehicle ignition signal received over the bus 104), the second set of emblem LEDs at a second time after the first time, the third set of emblem LEDs at a third time after the second time, etc. The emblem controller 110 may initiate illumination of respective sets of the emblem LEDs at respective times according to the timing sequence logic 130, thereby causing the sets of emblem LEDs to illuminate in an order tracing the outline associated with the emblem 512*a*. In this way, the vehicle grille assembly may illuminate the emblem of the vehicle grille structure 150 based on controlling the illumination and/or timing of illumination of one or more of the sets of emblem LEDs.

Stated another way, the emblem controller 110 and/or the timing sequence logic 130 may initiate, time, sequence, and/or control the illumination of the different sets of emblem LEDs such that the first set of emblem LEDs leads the tracing of the outline of the emblem 512*a* at a first time, the second set of emblem LEDs leads the tracing at a second time, and the third set of emblem LEDs leads the tracing at a third time. According to other aspects, a fourth set of emblem LEDs may lead the tracing at a fourth time. The first set of emblem LEDs may be configured to lead the tracing of the emblem, the second set of emblem LEDs may be illuminated to emphasize the tracing at a brighter or greater illumination level than the first set of emblem LEDs, the third set of emblem LEDs may include the body of the tracing, and the fourth set of emblem LEDs may trail the tracing at a dimmer or lower illumination level than the first or second set of emblem LEDs. An example of this may be seen in FIG. 5D, which will be discussed in greater detail herein.

In this regard, the emblem controller 110 may control illumination of the sets of emblem LEDs at a variety of illumination levels. For example, the emblem controller 110 may control illumination of the first set of emblem LEDs at a first illumination level, the second set of emblem LEDs at a second illumination level, the third set of emblem LEDs at a third illumination level, and a fourth set of emblem LEDs at a fourth illumination level. The emblem controller 110 may illuminate different sets of emblem LEDs at the second illumination level to be greater than the first illumination level and set respective emblem LEDs to have differing illumination levels at different times provided by the timing sequence logic 130.

With reference to a first time within FIG. 4A, emblem LEDs 412*a*, 412*a*' may be illuminated at the first illumination level, while emblem LEDs 412*b*, 412*b*', 412*c*, 412*c*' are off or set to an illumination level less than the first illumination level. At a second time within FIG. 4A, the emblem controller 110 may illuminate the first set of emblem LEDs 412*a*, 412*a*' at the first illumination level, the second set of emblem LEDs 412*b*, 412*b*' at a second illumination level greater than the first illumination level, while emblem LEDs 412*c*, 412*c*' are off or set to an illumination level less than the first illumination level. At a third time within FIG. 4A, the emblem controller 110 may illuminate the first set of emblem LEDs 412*a*, 412*a*' at a third illumination level less than the first illumination level, the second set of emblem LEDs 412*b*, 412*b*' at the first illumination level, and the third set of emblem LEDs 412*c*, 412*c*' at the second illumination level, which is greater than the first illumination level.

According to other aspects, a first illumination level and a second illumination level may be defined based on a trace width of associated LEDs. In other words, a trace width which is greater than another trace width may be defined as having a greater illumination level, due to the oblique nature of the first and second openings 310, 320, 330, and 340. For example, the emblem controller 110 may define the first set of emblem LEDs based on a first trace width, the second set of emblem LEDs based on a second trace width (which may be less than or greater than the first trace width), the third set of emblem LEDs based on a third trace width, and the fourth set of emblem LEDs based on a fourth trace width.

In this way, the emblem controller 110 may effect a tracing of a trace path 420 or 422 which includes a trace portion (e.g., 412c, 412c' at the third time within FIG. 4A) which appears brighter than the trailing segments (e.g., 412a, 412a' at the third time within FIG. 4A). In other words, the 'trace portion' is a segment including sets of LEDs which are the brightest among the sets of emblem LEDs and not necessarily the segment at a lead portion of the corresponding trace path. According to other aspects, 412b, 412b' at the third time within FIG. 4A may be considered the trace portion rather than 412c, 412c'. In this regard, at the third time within FIG. 4A, the emblem controller 110 may illuminate the first set of emblem LEDs 412a, 412a' at a third illumination level less than the first illumination level, the second set of emblem LEDs 412b, 412b' at the second illumination level, which is greater than the first illumination level, and the third set of emblem LEDs 412c, 412c' at the first illumination level. As mentioned, the trailing segments may appear to fade relative to the trace portions (e.g., based on the different, lower illumination levels relative to the trace portions).

Figure 4B:
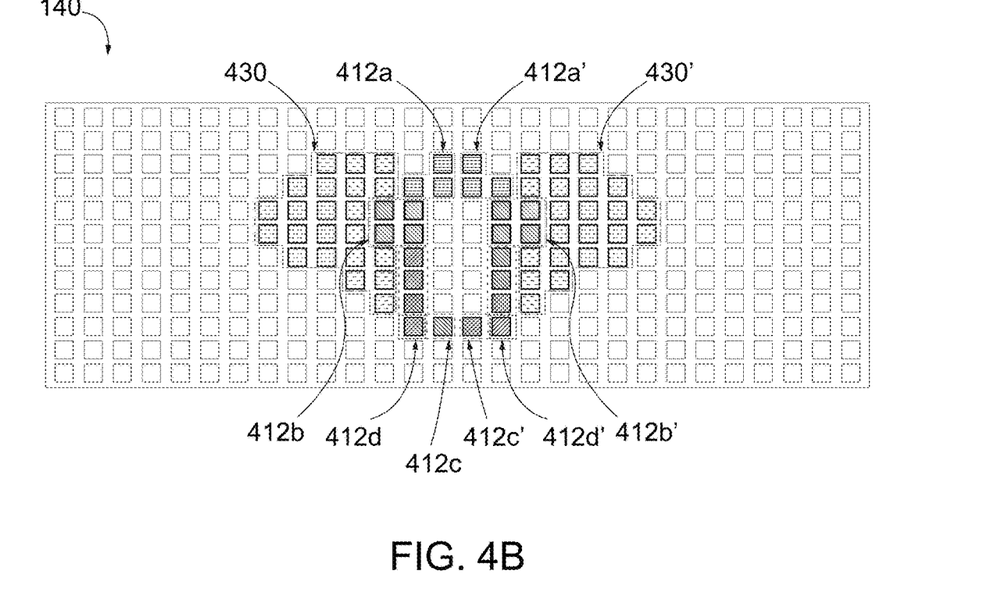

In FIG. 4B, the LEDs of the backlight panel 140 are controlled by the emblem controller 110 and the timing sequence logic 130. The timing sequence logic 130 may define 412a and 412a' as the first set of emblem LEDs, 412b and 412b' as the second set of emblem LEDs, 412c and 412c' as the third set of emblem LEDs, and 412d and 412d' as a fourth set of emblem LEDs. It should be noted that FIG. 4B is an illustration of an exemplary scenario which occurs at a time after the scenario of FIG. 4A, and according to one or more aspects, FIGS. 4A-4D occur in chronological order. The timing sequence logic 130 may define different sets of emblem LEDs differently at different times. For example, the timing sequence logic 130 may define the first, second, and third sets of emblem LEDs from the set of LEDs associated with the outline of the emblem at a first time and define the first, second, and third sets of emblem LEDs from the set of LEDs associated with the outline of the emblem differently at a second time than at the first time. An example of this may be seen in FIG. 4B, where 412c (and 412c', which is a mirror image of 412c) includes five LEDs, while in FIG. 4A, 412c merely includes a single LED.

Further, the timing sequence logic 130 may define additional sets of emblem LEDs from the set of LEDs associated with the outline of the emblem at different times. For example, in FIG. 4A the timing sequence logic 130 defined a first, second, and third set of emblem LEDs, while in FIG. 4B, at a subsequent or later time, a first, second, third, and fourth set of emblem LEDs are defined by the timing sequence logic 130. In any event, timing sequence logic 130 may determine the order of illumination to be the first set of emblem LEDs 412a, 412a', followed by the second set of emblem LEDs 412b, 412b', followed by the third and fourth sets of emblem LEDs 412c, 412c', 412d, 412d'. Because the lighting sequence of FIG. 4B occurs after the lighting sequence of FIG. 4A, the third set of emblem LEDs 412c, 412c' and the fourth set of emblem LEDs 412d, 412d' are leading the trace paths 420 and 422, followed by the second set of emblem LEDs 412b, 412b', and the first set of emblem LEDs 412a, 412a'. The timing sequence logic 130 may control the order of illumination based on a direction of the trace paths 420, 422, and not necessarily based on in order of the first, second, third, and fourth set of emblem LEDs. For example, with reference to trace path 420 and FIG. 4B, the emblem LEDs 412a, 412b, and some of the emblem LEDs of 412c may be illuminated in that order. However, the emblem LED 412d may be illuminated prior to the last LED of 412c closest to the center portion 450 of the LED backlight panel 140 being illuminated.

The emblem controller 110 may set the illumination levels for the sets of emblem LEDs based on a number of sets of emblem LEDs which are activated. As seen in FIG. 4B, sets of emblem LEDs associated with the trace paths 420, 422 may be defined in a non-contiguous manner (e.g., 412d, 412d' interposed between LEDs of 412c, 412c'). The emblem controller 110 may control illumination of the sets of emblem LEDs such that the emblem LED in the lead of the trace path 420, 422 is not set to the highest illumination level. In this regard, the emblem controller 110 may illuminate the first set of emblem LEDs 412a, 412a' at a first illumination level (which may be off or less than the other illumination levels), the second set of emblem LEDs 412b, 412b' at a second illumination level, the third set of emblem LEDs 412c, 412c' at a third illumination level, and the fourth set of emblem LEDs 412d, 412d' at a fourth illumination level which is greater than the first, second, and third illumination levels.

Further, in FIG. 4B, the peripheral controller 120 may control illumination of a first set of peripheral LEDs 430, 430' at a first peripheral illumination level at a time after initiation of illumination of the sets of the emblem LEDs by the emblem controller 110, such as after a time when the fourth set of emblem LEDs 412d, 412d' are illuminated at the fourth illumination level. In this way, the peripheral controller 120 is activated subsequent to the emblem controller 110, while LEDs associated with both the peripheral controller 120 and the emblem controller 110 are illuminated or operated in the concurrent fashion. The peripheral controller 120 is responsible for controlling illumination of LEDs 430 (FIG. 4B, 4C), 432 (FIG. 4C) arranged circumferentially about the center portion 450 of the backlight panel 140 to illuminate outwardly in a lateral direction from the center portion 450. Stated another way, the timing sequence logic 130 initiates the peripheral controller 120 at a second activation timing after a first activation timing associated with the emblem controller 110, thereby enabling the illumination of LEDs at a center portion of the backlight panel 140 to illuminate in an order tracing an outline associated with the emblem, and then, after initiation of tracing the outline, controlling illumination of LEDs arranged circumferentially about the center portion of the backlight panel 140 to illuminate outwardly in a lateral direction from the center portion.

Figure 4C:
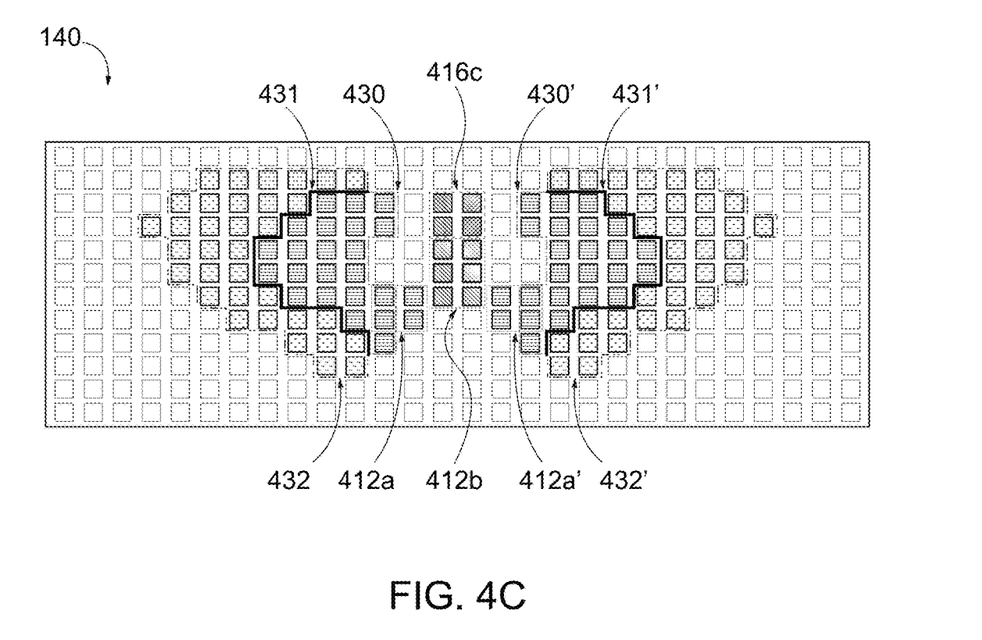

In FIG. 4C, the emblem controller 110 may define 412a, 412a' as the first set of emblem LEDs, 412b, 412b' as the second set of emblem LEDs, and 416c as the third set of emblem LEDs. The timing sequence logic 130 may determine the order of illumination to be the first set, the second set, and then the third set of emblem LEDs and control the timing of the illumination such that the first set of emblem LEDs is initiated at a first time within FIG. 4C. At a second time after the first time within FIG. 4C, the timing sequence logic 130 may initiate illumination of the second set of emblem LEDs. Further, at the second time within FIG. 4C, the timing sequence logic 130 may disable illumination (or lower the illumination level) of the first set of emblem LEDs. At a third time within FIG. 4C, the timing sequence logic 130 may initiate illumination of the third set of emblem LEDs and disable or lower the illumination level of the first and second sets of emblem LEDs. Because the third set of emblem LEDs is defined as 416c, this may represent a common end point for the two trace paths 420, 422. Therefore, the emblem controller 110 may control illumination of the LEDs tracing the at least two trace paths 420, 422 to include a common start point or a common end point.

Further, in FIG. 4C, the peripheral controller 120 may define 430, 430' and 432, 432' as a first and second set of peripheral LEDs. Thus, the first set of peripheral LEDs is arranged circumferentially adjacent to the center portion 450 of the backlight panel 140 and the second set of peripheral LEDs is arranged circumferentially about the first set of peripheral LEDs. In any event, the peripheral controller 120 may control illumination of the first set of peripheral LEDs and the second set of peripheral LEDs after illumination of the emblem LEDs is initiated by the emblem controller 110. With reference to FIG. 4B, the peripheral controller 120 controls illumination of the first set of peripheral LEDs 430, 430' at a first peripheral illumination level at a first time. At a second time later than the time in FIG. 4B, and with reference to FIG. 4C, the peripheral controller 120 controls illumination of the first set of peripheral LEDs to be at a second peripheral illumination level less than the first peripheral illumination level and controls illumination of the second set of peripheral LEDs to be at the first peripheral illumination level.

According to one or more aspects, the first and second sets of peripheral LEDs 430, 430', 432, 432' may be defined according to a boundary 431 (or 431') and LEDs on each side of the boundary may be illuminated at respective first and second peripheral illumination levels. According to other aspects, the LEDs along this boundary 431 (or 431') may be illuminated gradually, according to a gradient, or at an illumination level between the first and second peripheral illumination levels. Further, the timing sequence logic 130 may define the first set of peripheral LEDs and the second set of peripheral LEDs differently at a second time than at a first time. Stated another way, the timing sequence logic 130 may assign LEDs to the sets of peripheral LEDs such that the groups or sets of peripheral LEDs do not necessarily include the same number of LEDs from one time to another (e.g., similarly to how 412c in FIG. 4A includes merely a single LED, but 412c in FIG. 4B includes multiple LEDs). In this way, the peripheral controller 120 may control illumination of the peripheral LEDs to illuminate outwardly in the lateral direction, away from the center portion 450 of the backlight panel 140, and to illuminate according to a wave formation based on the LEDs defined within the sets of peripheral LEDs.

Figure 4D:
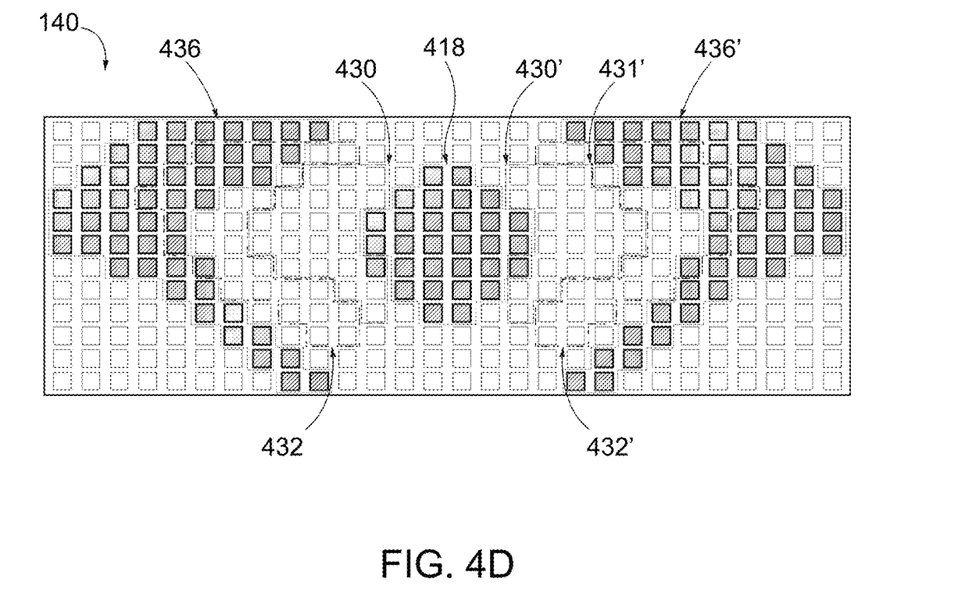

In FIG. 4D, the backlight panel 140 is depicted in a state where the emblem controller 110 controls a set of LEDs 418 to fully illuminate the first opening 310 of the vehicle grille structure 150. As previously discussed, a time associated with FIG. 4D is a time subsequent to the time associated with FIG. 4C. In any event, the emblem controller 110 may control illumination of the set of LEDs 418 to be at a first illumination level. The peripheral controller 120 may control illumination of the first and second sets of peripheral LEDs 430, 430', 432, 432' and a third set of peripheral LEDs 436, 436'. The timing sequence logic 130 may determine that the first and second sets of peripheral LEDs 430, 430', 432, 432' are to be disabled or dimmed and that the third set of peripheral LEDs 436, 436' is to be enabled or illuminated at this time. The peripheral controller 120 may thus illuminate the third set of peripheral LEDs 436, 436' at the first peripheral illumination level. According to one or more aspects, the peripheral controller 120 may illuminate the second set of peripheral LEDs 432, 432' at the second peripheral illumination level (e.g., which may be slightly dimmer or less than the first peripheral illumination level).

FIGS. 5A-5G are illustrations of the vehicle grille assembly in different illumination states, as controlled by the system of FIG. 1 and based on different illumination states associated with the backlight panel 140, such as, for example, the illumination states of FIGS. 4A-4D.

Figure 5A:
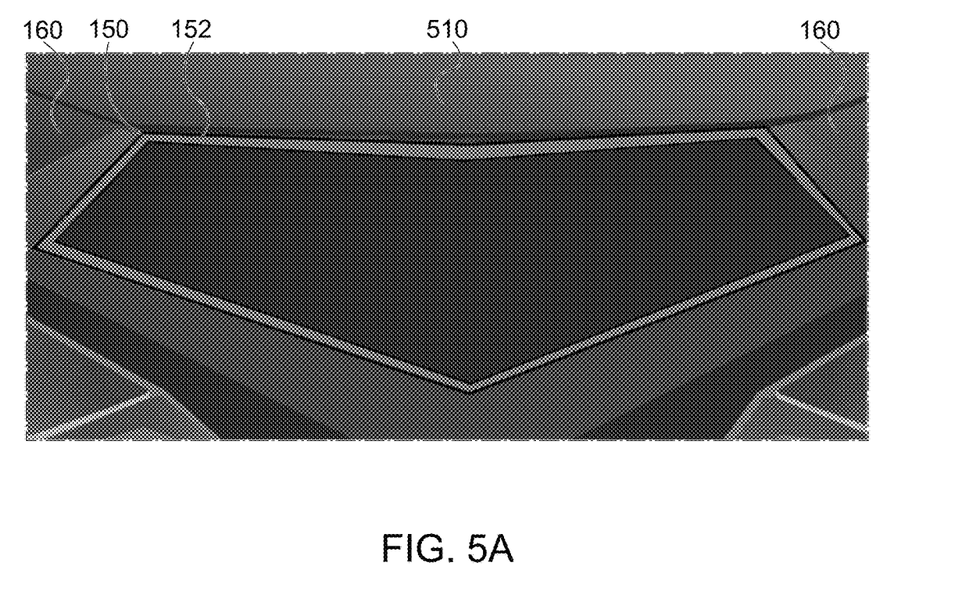
FIGS. 5A-5G are illustrations of the vehicle grille assembly in different illumination states, as controlled by the system of FIG. 1.

In FIG. 5A, the vehicle grille structure 150 may be positioned between the headlights 160 of the vehicle and in front of a hood of the vehicle, near a center portion 510, in the longitudinal direction. The vehicle grille structure 150 may include an LED border 152, which may be provided by the backlight panel 140 or included with the vehicle grille structure 150. Stated another way, the LEDs 152 may be arranged around a perimeter (e.g., around the rim of) of the vehicle grille structure 150 in a final illumination state for the vehicle grille structure 150 (although headlights 160 and other lights may be activated thereafter). The timing associated with the light up of LEDs 152 or the headlights 160 may coincide with completion of engine startup or ignition of the engine of the vehicle. The LEDs of the backlight panel 140 are off in FIG. 5A, in a state prior to ignition of the vehicle or receiving a vehicle ignition signal.

Figure 5B:
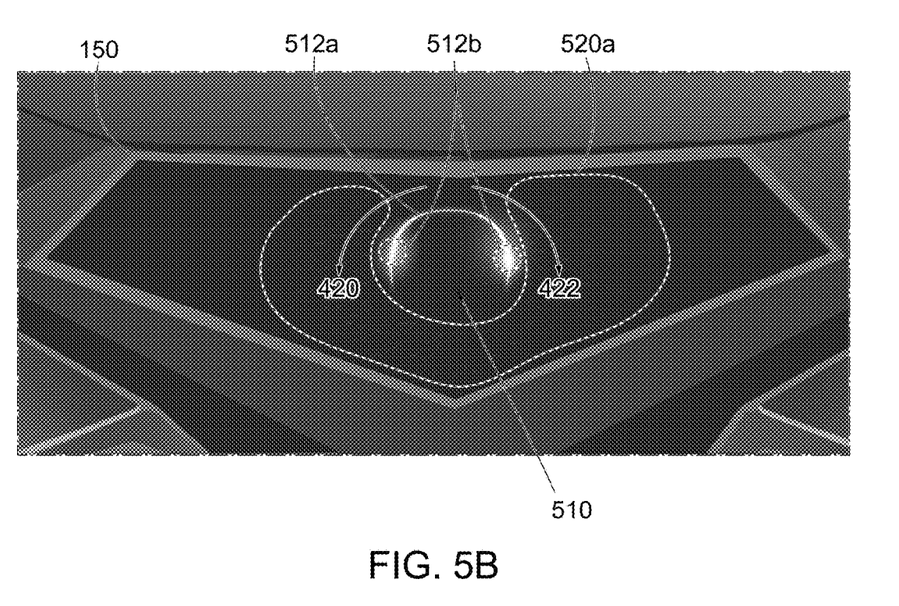

FIG. 5B generally corresponds to the illumination state of the backlight panel 140 with reference to FIG. 4A where the emblem controller 110 controls illumination of the different sets of emblem LEDs 412a, 412a', 412b, 412b', 412c, 412c' (e.g., with the timing sequence logic 130 controlling the timing of the illumination, beginning illumination with 412a, 412a' and ending with 412c, 412c', thereby producing a sequential light up animation along trace paths 420, 422). In any event, referring to FIG. 5B again, a perspective of the illumination is provided from a point of view associated with the outer surface 264 (FIG. 2B) of the vehicle grille structure 150, which covers the backlight panel 140. Due to the light up sequence of the different sets of emblem LEDs 412a, 412a', 412b, 412b', 412c, 412c', the animation along trace paths 420, 422 may be seen. The LEDs at a center portion 510 of the vehicle grille structure 150 are off in this illumination state. At 512a, the outline of the emblem is traced. 512b corresponds to a trace portion (e.g., associated with the LEDs 412b, 412b' in FIG. 4B) of LEDs which are illuminated brighter or at an illumination level greater than the illumination level of other emblem LEDs. In this example. The LEDs 412c, 412c' are defined (by the emblem controller 110) a lead portion and the LEDs 412b, 412b' are defined as the trace portion. The peripheral controller 120 assigns the first set of peripheral LEDs 520a an illumination level of off in this illumination state.

Figure 5C:
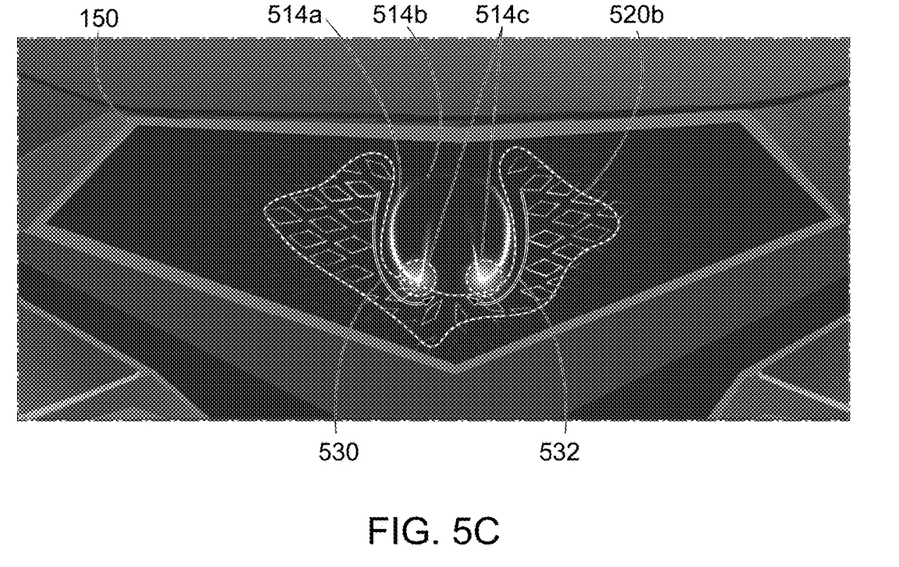

FIG. 5C generally corresponds to the illumination state of the backlight panel 140 with reference to FIG. 4B. In FIG. 5C, the LEDs associated with 514a, 514b (e.g., 412a, 412b, 412a' 412b' of FIG. 4B) are dimmed as the trace paths evolve from 420, 422 to trace paths 530, 532. The emblem controller 110 updates a new set of LEDs to be the lead portion and the trace portion, shown at 514c, which are brighter than the LEDs associated with the lead portion of the trace paths 530, 532. Additionally, the peripheral controller 120 initiates illumination of the peripheral LEDs in the first set of peripheral LEDs 520b.

Figure 5D:
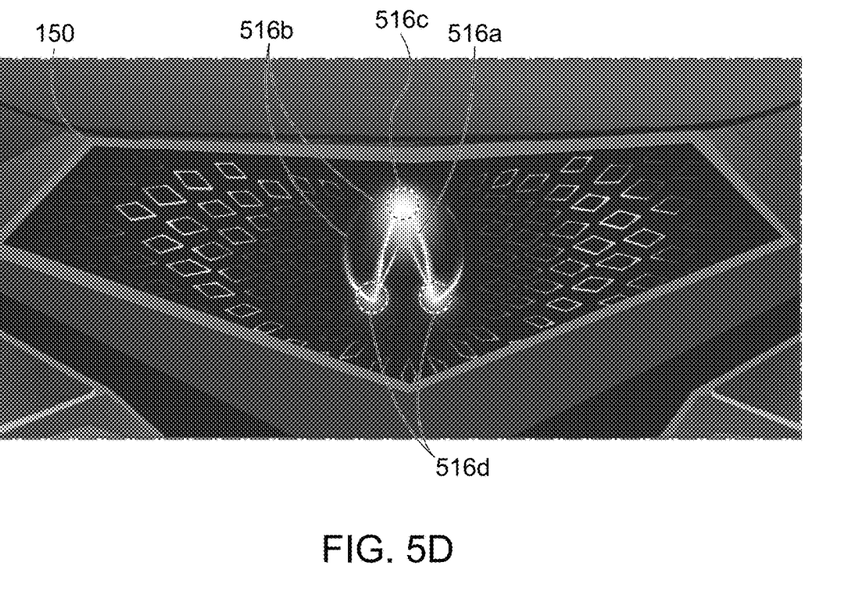

FIG. 5D generally corresponds to the illumination state of the backlight panel 140 with reference to FIG. 4C. In FIG. 5D, the emblem controller 110 controls the tracing of the emblem LEDs based on different sets of emblem LEDs, including 516a, 516b, 516c, and 516d. The emblem controller 110 defines two sets of the trace portions at 516c and 516d which have illumination levels greater than the illumination levels of 516a (primary trace path illumination level) and 516b (trailing trace path illumination level).

Figure 5E:
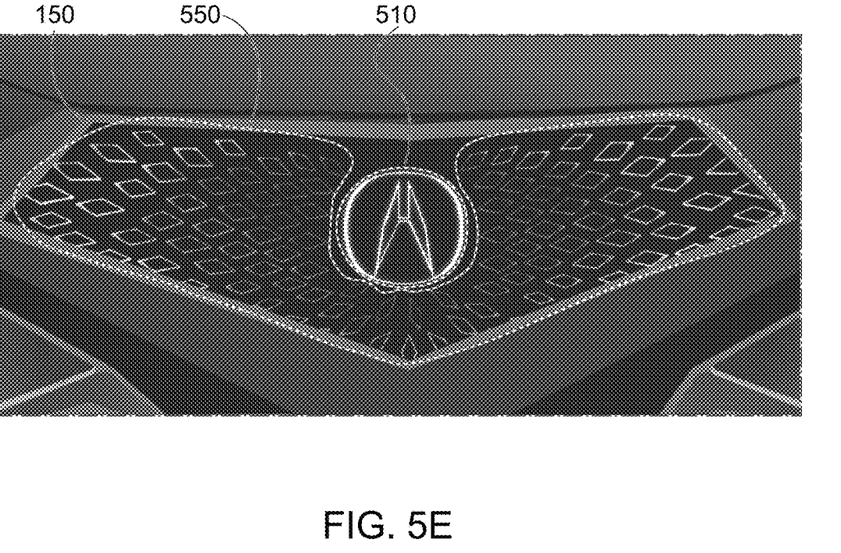
Figure 5F:
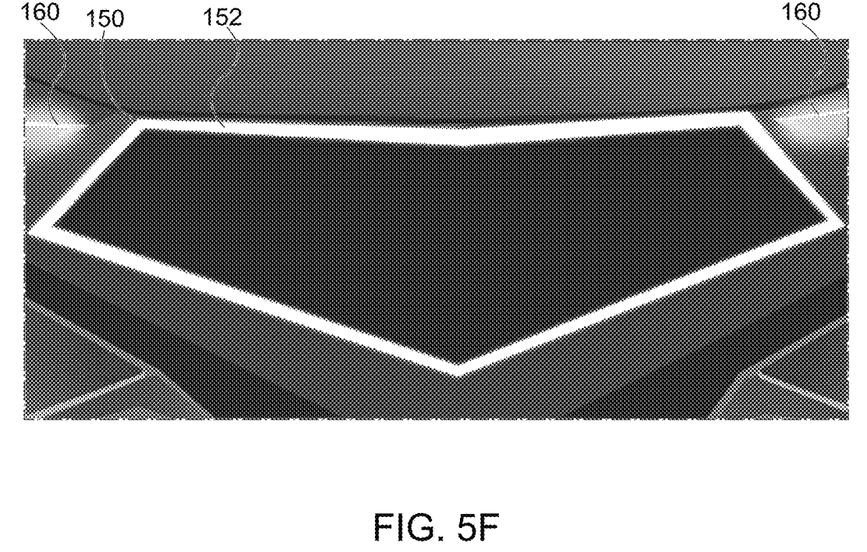
Figure 5G:
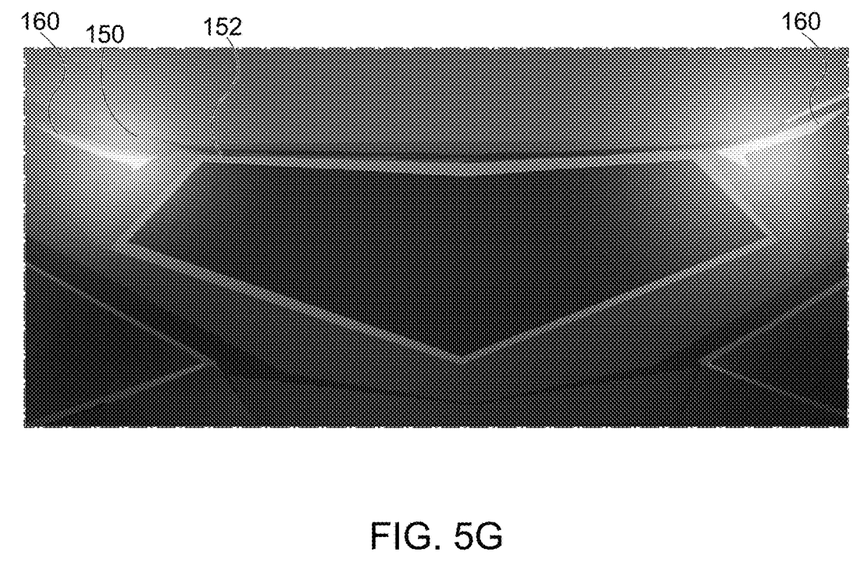

FIG. 5E illustrates the emblem fully illuminated 610, and corresponds to FIG. 4D. However, FIG. 5E depicts a slightly different aspect where the peripheral LEDs 550 are all illuminated, while FIG. 4D depicts the third set of peripheral LEDs 436, 436' in an illuminated state. FIG. 5F illustrates the LED border 152 illuminated and the headlights 160 illuminated in a state where the emblem LEDs are now off. FIG. 5G illustrates a subsequent illumination state where the LED border 152 is disabled, and merely the headlights 160 are illuminated.

Figure 6:
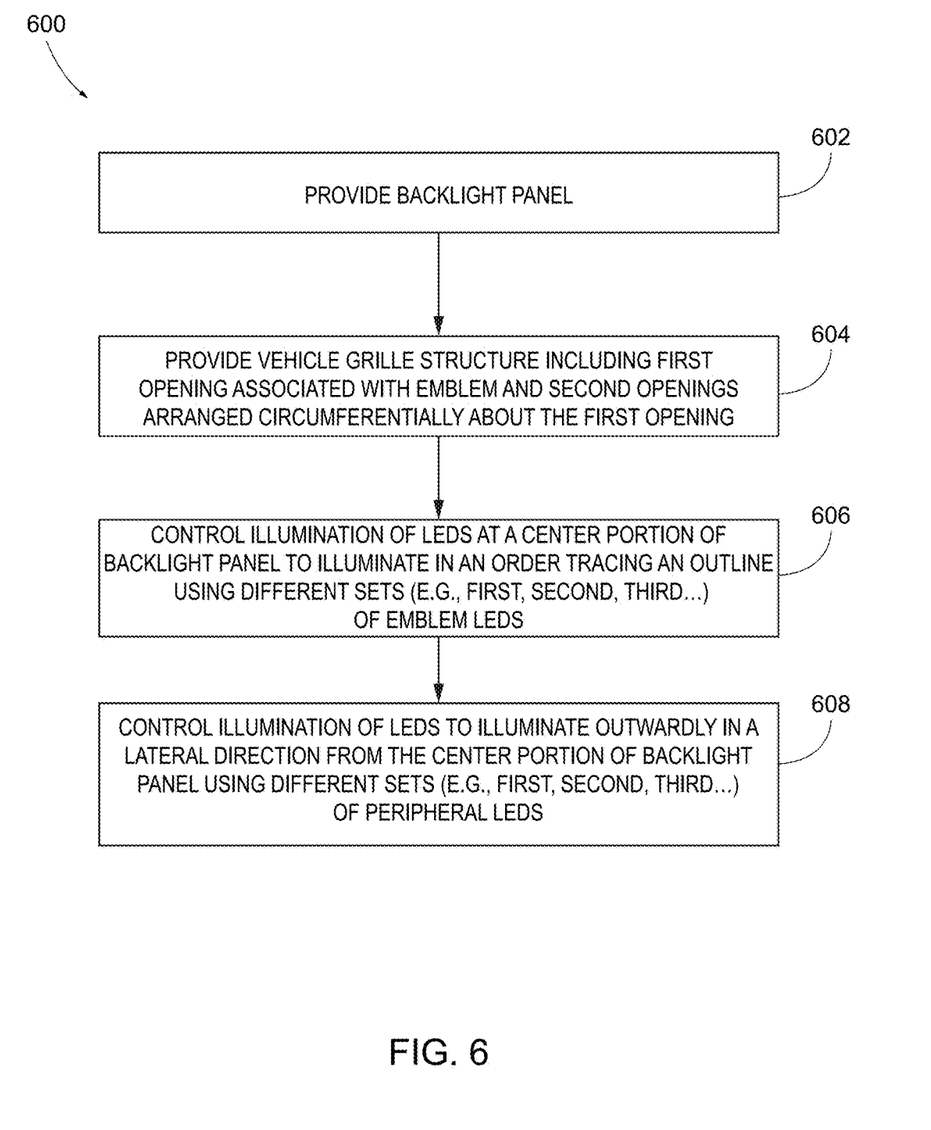
FIG. 6 is a flow diagram of a method for controlling illumination of a vehicle grille assembly.

FIG. 6 is a flow diagram of a method for controlling illumination of a vehicle grille assembly. At 602, a backlight panel is provided. At 604, a vehicle grille structure is provided. The vehicle grille structure may include a first opening associated with an emblem and a second opening arranged circumferentially about the first opening. The first and second openings may include sets or subsets of openings. The second openings may be diamond shaped. The vehicle grille structure may be arranged facing the backlight panel such that light emitted from the backlight panel is directed to an inner surface of the vehicle grille structure and viewable from an outer surface of the vehicle grille structure.

At 606, illumination of emblem LEDs a center portion of the backlight panel are controlled by an emblem controller. The emblem controller controls these LEDS to illuminate in an order tracing an outline associated with the emblem, and may define sets of emblem LEDs which may be illuminated according to different illumination levels. At 608, illumination of peripheral LEDs is controlled by a peripheral controller which causes the peripheral LEDs to illuminate outwardly in a lateral direction from the center portion of the backlight panel using different sets of peripheral LEDs.

Figure 7:
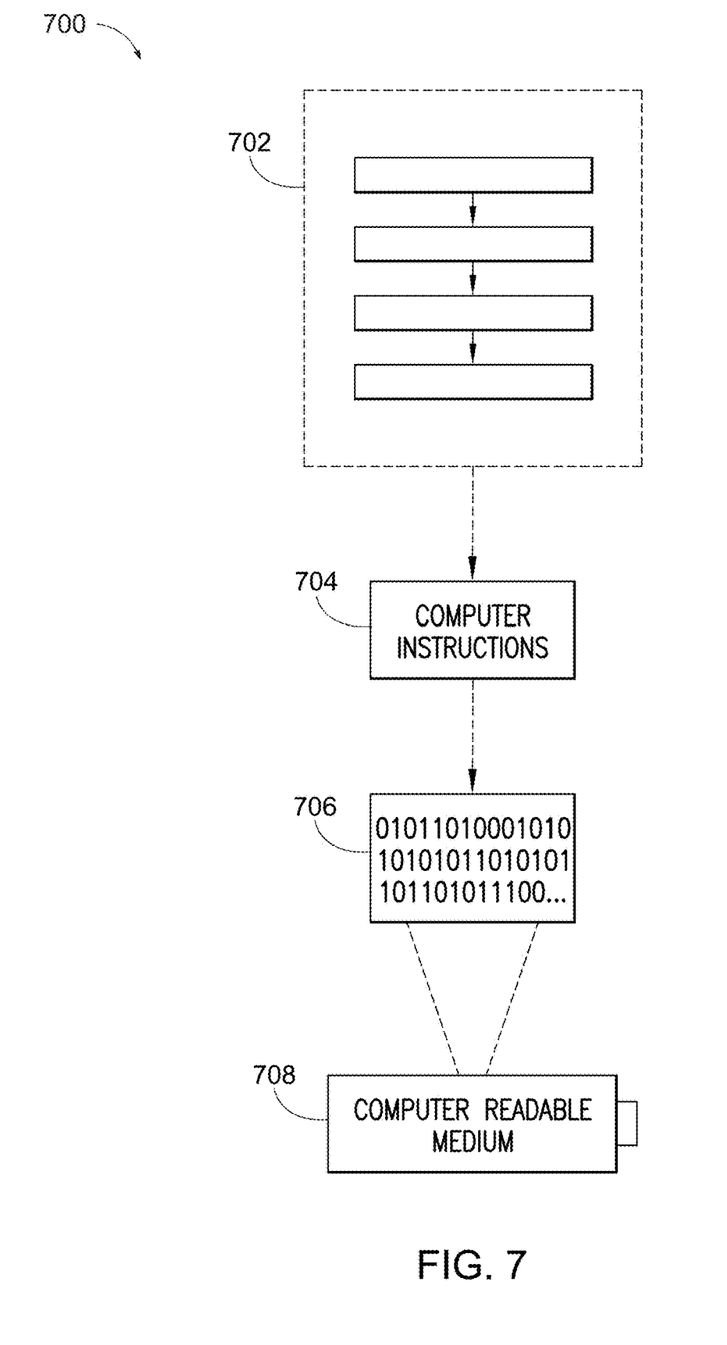
FIG. 7 is an illustration of an example computer-readable medium or computer-readable device including processor-executable instructions configured to embody one or more of the provisions set forth herein, according to one or more aspects.

Still another embodiment involves a computer-readable medium including processor-executable instructions configured to implement one or more embodiments of the techniques presented herein. An embodiment of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This computer-readable data 706, such as binary data including a plurality of zero's and one's as shown in 706, in turn includes a set of computer instructions 704 configured to operate according to one or more of the principles set forth herein. In one such embodiment 700, the processor-executable computer instructions 704 may be configured to perform a method 702, such as the method 600 of FIG. 6. In another embodiment, the processor-executable instructions 704 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
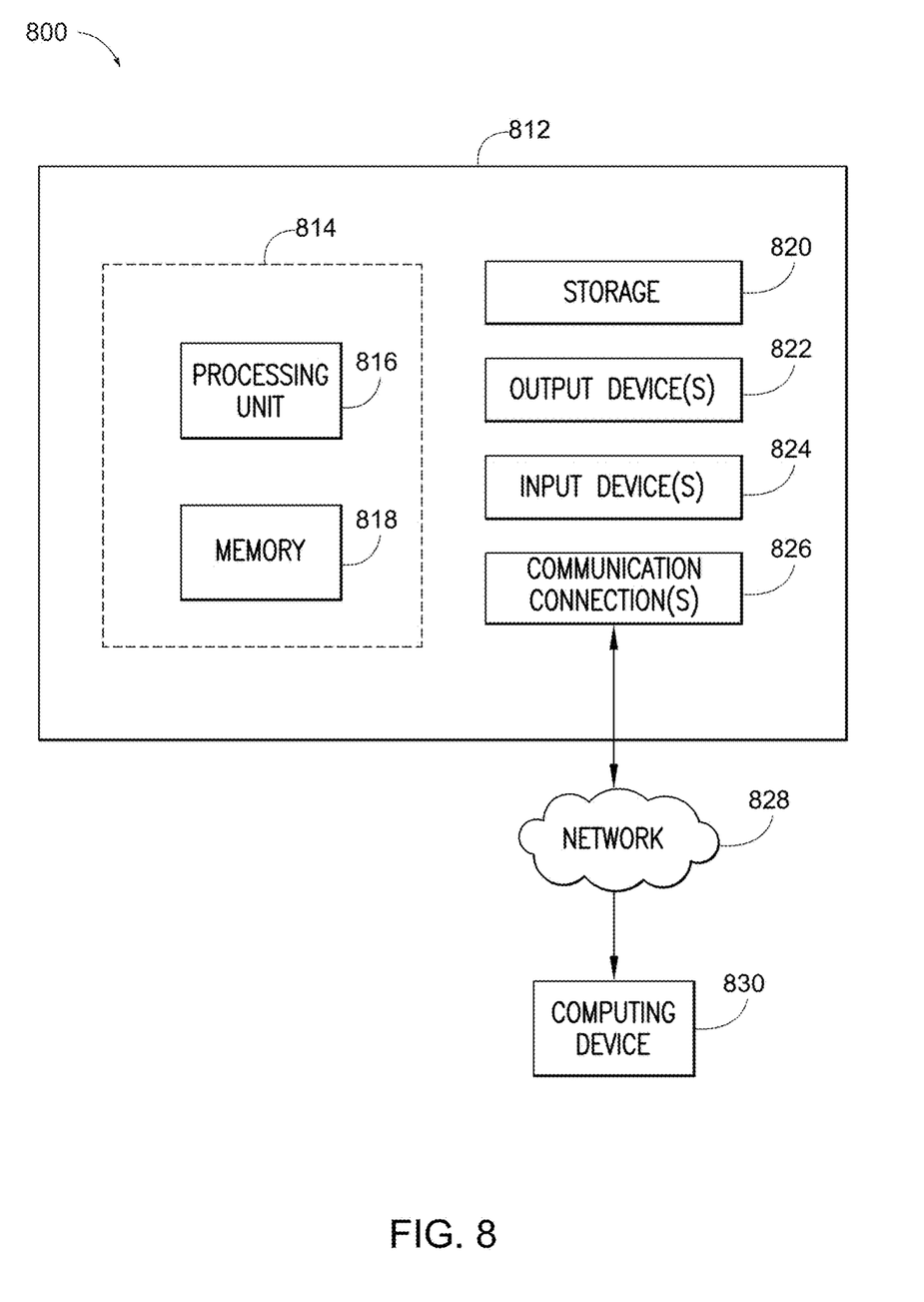
FIG. 8 is an illustration of an example computing environment where one or more of the provisions set forth herein are implemented, according to one or more aspects.

FIG. 8 and the following discussion provide a description of a suitable computing environment to implement embodiments of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one or more embodiments provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other embodiments, device 812 includes additional features or functionality. For example, device 812 may include additional storage such as removable storage or non-removable storage, including, but not limited to, magnetic storage, optical storage, etc. Such additional storage is illustrated in FIG. 8 by storage 820. In one or more embodiments, computer readable instructions to implement one or more embodiments provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 812. Any such computer storage media is part of device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 812 includes input device(s) 824 such as keyboard, mouse, pen, voice input device, touch input device, infrared cameras, video input devices, or any other input device. Output device(s) 822 such as one or more displays, speakers, printers, or any other output device may be included with device 812. Input device(s) 824 and output device(s) 822 may be connected to device 812 via a wired connection, wireless connection, or any combination thereof. In one or more embodiments, an input device or an output device from another computing device may be used as input device(s) 824 or output device(s) 822 for computing device 812. Device 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for controlling illumination of a vehicle grille assembly, comprising:
    a backlight panel including a plurality of light emitting diodes (LEDs) arranged in at least one array;
    a vehicle grille structure arranged facing the backlight panel such that light emitted from the backlight panel is directed to an inner surface of the vehicle grille structure and viewable from an outer surface of the vehicle grille structure,
    wherein the vehicle grille structure includes a first opening associated with an emblem arranged at a center portion of the vehicle grille structure and a plurality of second diamond shaped openings arranged circumferentially about the first opening;
    an emblem controller controlling illumination of LEDs at a center portion of the backlight panel to illuminate in an order tracing an outline associated with the emblem; and
    a peripheral controller controlling illumination of LEDs arranged circumferentially about the center portion of the backlight panel to illuminate outwardly in a lateral direction from the center portion.

2. The system of claim 1, wherein the emblem controller controls a first set of emblem LEDs leading the tracing, a second set of emblem LEDs following the first set of LEDs, a third set of emblem LEDs following the second set of emblem LEDs, and a fourth set of emblem LEDs following the third set of emblem LEDs.

3. The system of claim 2, comprising a timing sequence logic defining the first, second, third, and fourth set of emblem LEDs from a set of LEDs associated with the outline of the emblem at a first time.

4. The system of claim 3, wherein the timing sequence logic defines the first, second, third, and fourth set of emblem LEDs from the set of LEDs associated with the outline of the emblem differently at a second time than at the first time.

5. The system of claim 2, wherein the emblem controller illuminates the first set of emblem LEDs at a first illumination level, the second set of emblem LEDs at a second illumination level greater than the first illumination level, the third set of emblem LEDs at a third illumination level, and the fourth set of emblem LEDs at a fourth illumination level less than the first illumination level.

6. The system of claim 5, wherein the fourth illumination level is off.

7. The system of claim 1, wherein the emblem controller controls illumination of the LEDs tracing the outline to include at least two trace paths which illuminate in a simultaneous fashion.

8. The system of claim 7, wherein the emblem controller controls illumination of the LEDs tracing the at least two trace paths to include a common start point or a common end point.

9. The system of claim 1, wherein the peripheral controller controls a first set of peripheral LEDs and a second set of peripheral LEDs, the first set of peripheral LEDs arranged circumferentially adjacent to the center portion of the backlight panel, the second set of peripheral LEDs arranged circumferentially about the first set of peripheral LEDs.

10. The system of claim 9, wherein the peripheral controller:
 illuminates the first set of peripheral LEDs at a first illumination level at a first time; and
 illuminates the first set of peripheral LEDs at a second illumination level less than the first illumination level and illuminates the second set of peripheral LEDs at the first illumination level at a second time.

11. The system of claim 9, comprising a timing sequence logic:
 defining the first set of peripheral LEDs and the second set of peripheral LEDs from a set of LEDs arranged circumferentially about the center portion of the backlight panel at a first time; and
 defining the first set of peripheral LEDs and the second set of peripheral LEDs differently at a second time.

12. The system of claim 1, comprising a timing sequence logic:
 initiating illumination of a first set of LEDs at a first time;
 initiating illumination of a second set of LEDs at a second time after the first time; and
 disabling illumination of the first set of LEDs at the second time.

13. The system of claim 1, wherein the first opening and the second openings extend from the vehicle grille structure obliquely towards the backlight panel.

14. The system of claim 1, wherein the vehicle grille structure is pentagonally shaped.

15. A system for controlling illumination of a vehicle grille assembly, comprising:
 a backlight panel including a plurality of light emitting diodes (LEDs) arranged in a matrix configuration;
 a vehicle grille structure arranged facing the backlight panel such that light emitted from the backlight panel is directed to an inner surface of the vehicle grille structure and viewable from an outer surface of the vehicle grille structure,
 wherein the vehicle grille structure includes a first opening associated with an emblem arranged at a center portion of the vehicle grille structure and a plurality of second diamond shaped openings arranged circumferentially about the first opening;
 an emblem controller controlling illumination of LEDs at a center portion of the backlight panel to illuminate in an order tracing an outline associated with the emblem;
 a peripheral controller controlling illumination of LEDs arranged circumferentially about the center portion of the backlight panel to illuminate outwardly in a lateral direction from the center portion; and
 a timing sequence logic controlling a first activation timing associated with the emblem controller and a second activation timing associated with the peripheral controller, wherein the second activation timing is after the first activation timing, and the first timing is based on a vehicle ignition signal.

16. The system of claim 15, wherein the emblem controller controls a first set of emblem LEDs leading the tracing, a second set of emblem LEDs following the first set of LEDs, a third set of emblem LEDs following the second set of emblem LEDs, and a fourth set of emblem LEDs following the third set of emblem LEDs.

17. The system of claim 16, wherein the emblem controller defines the first set of emblem LEDs based on a first trace width, the second set of emblem LEDs based on a second trace width greater than the first trace width, the third set of emblem LEDs based on a third trace width, and the fourth set of emblem LEDs based on a fourth trace width.

18. The system of claim 15, wherein the emblem controller controls illumination of the LEDs tracing the outline to include at least two trace paths which illuminate in a simultaneous fashion.

19. The system of claim 18, wherein the emblem controller controls illumination of the LEDs tracing the at least two trace paths to include a common start point or a common end point.

20. A method for controlling illumination of a vehicle grille assembly, comprising:
 providing a backlight panel including a plurality of light emitting diodes (LEDs) arranged in at least one array;
 providing a vehicle grille structure arranged facing the backlight panel such that light emitted from the backlight panel is directed to an inner surface of the vehicle grille structure and viewable from an outer surface of the vehicle grille structure,
 wherein the vehicle grille structure includes a first opening associated with an emblem arranged at a center portion of the vehicle grille structure and a plurality of second diamond shaped openings arranged circumferentially about the first opening;
 controlling illumination of LEDs at a center portion of the backlight panel to illuminate in an order tracing an outline associated with the emblem; and
 controlling, after tracing the outline, illumination of LEDs arranged circumferentially about the center portion of the backlight panel to illuminate outwardly in a lateral direction from the center portion of the backlight panel.

* * * * *